United States Patent [19]

Dietsche et al.

[11] 4,205,783
[45] Jun. 3, 1980

[54] INDEPENDENT BIASING MEANS FOR AUTOMATIC FLUE DAMPER

[75] Inventors: Robert J. Dietsche, Elyria, Ohio; George W. Nagel, Forest Hills, Pa.

[73] Assignee: Westinghouse Electric Corp., Pittsburgh, Pa.

[21] Appl. No.: 900,683

[22] Filed: Apr. 27, 1978

[51] Int. Cl.² .................. G05D 23/00; F16K 5/00
[52] U.S. Cl. .................. 236/1 G; 251/133; 251/313; 126/285 B; 431/20
[58] Field of Search .............. 236/1 G; 251/336, 337, 251/129, 305, 313, 130, 292, 133; 185/11, 40 R; 137/316, 329.4, 614.19, 878; 126/285 B; 431/20

[56] References Cited

U.S. PATENT DOCUMENTS

| 4,039,123 | 8/1977 | Frankel | 236/1 G |
| 4,102,629 | 7/1978 | Feinberg | 236/1 G |

*Primary Examiner*—William E. Wayner
*Assistant Examiner*—Harry Tanner
*Attorney, Agent, or Firm*—E. C. Arenz

[57] ABSTRACT

For a vent or flue damper of the type in which the damper is closed by an electrically energized actuator when the furnace is off and the actuator has first biasing means to open the damper when the actuator is deenergized, a second biasing means such as a torsion spring, independent of the first biasing means, is associated directly with the damper shaft and is adapted to always move the damper to an open position in the absence of the actuator.

2 Claims, 6 Drawing Figures

INDEPENDENT BIASING MEANS FOR AUTOMATIC FLUE DAMPER

CROSS REFERENCE TO RELATED APPLICATIONS

This application is one of several relating to a total damper assembly which in its totality is considered the preferred form.

The thus related applications include:

Dietsche-Schuster U.S. Pat. application Ser. No. 900,683, filed Apr. 27, 1978 (W. E. 47,869), relating to a preferred damper shaft arrangement in which opposite stub shafts of a particular configuration are applicable to a range of damper sizes.

Nagel U.S. patent application Ser. No. 900,682, filed Apr. 27, 1978 (W. E. Case 47,878), relating to a crank-shaped shaft end and slotted disk drive coupling assuring the proper coupling arrangement and providing an external visual indication of the internal damper position.

Nagel U.S. patent application Ser. No. 900,680, filed Apr. 27, 1978 (W. E. Case 47,945), relating to a control arrangement for electrically stopping the damper plate in its open position and reducing any chance that the particular arrangement used to accomplish the stopping does not result in a damper hangup in an incorrect position under infrequently encountered, but possible, conditions.

BACKGROUND OF THE INVENTION

The invention pertains to the art of flue or vent damper construction.

As a result of the desirability of energy conservation, a number of different types of flue or vent dampers have recently become available. Of the types with which we are familiar, all except the thermally actuated, bimetal type, have some kind of actuating means external of the flue pipe. If the external actuating means must be removed for any reason, such as service or replacement for example, the damper plate in the damper assemblies of which we know are generally free to assume any position between open and closed. That is, it is the external actuator which imposes control of the damper plate position and in the absence of the actuator there is no automatic control of the damper position. This can lead to a potentially unsafe condition in the event steps are not taken to insure that the damper is moved to an open position and then somehow fastened in that position if the actuator is to be detached for any significant period. An example would be if a replacement actuator was required during a service call, but the serviceman did not have one available in his mobile stock and had to leave the premises for some undetermined time during which it would be desirable that the furnace operate.

Accordingly, one aim of our invention is to insure that the damper plate automatically assumes an open position when the actuator is detached for any reason.

Another aim is to provide an arrangement in which biasing means associated with the damper plate shaft will automatically hold the damper plate and associated parts in the right position to facilitate coupling of the particular actuator means with the remainder of the damper assembly.

SUMMARY OF THE INVENTION

In accordance with the invention, in a flue damper assembly of the type in which electrically energized actuator means holds a flue damper on a pivotal shaft closed in a flue pipe section through energization of the actuator means during periods of no-heat demand, and the actuator means includes first means biasing the actuator to a flue damper open position in the absence of energization, a second means is provided connected to the flue damper shaft, and independent of the first biasing means of said actuator means, operable to move the damper to an open position whenever said actuator means is detached from operative relation with flue damper. In the preferred arrangement, the second biasing means comprises a helical torsion spring having one end attached to the pipe section and the other end attached to the pivotal shaft and with the biasing force exerted by the second biasing means being relatively light with respect to the force available from the actuator in both its damper closing and damper opening modes of operation.

DRAWING DESCRIPTION

DESCRIPTION OF THE PREFERRED EMBODIMENT

The damper assembly as a whole, including the actuator means, is described in some detail in this application to insure compliance with the statutory requirement of best mode currently contemplated by the inventors, as well as to provide a thorough understanding of how the particular features of the subject invention are advantageous in connection with the structure of the assembly as a whole and the operating characteristics of the particular type of actuator considered preferable. However, it is to be understood that as generally delineated in the section titled "Cross Reference to Related Applications", other inventive entities have also contributed significantly to the assembly as a whole, and what is desired to be claimed in this application is only that which falls within the scope of the appended claims.

Figure 1:
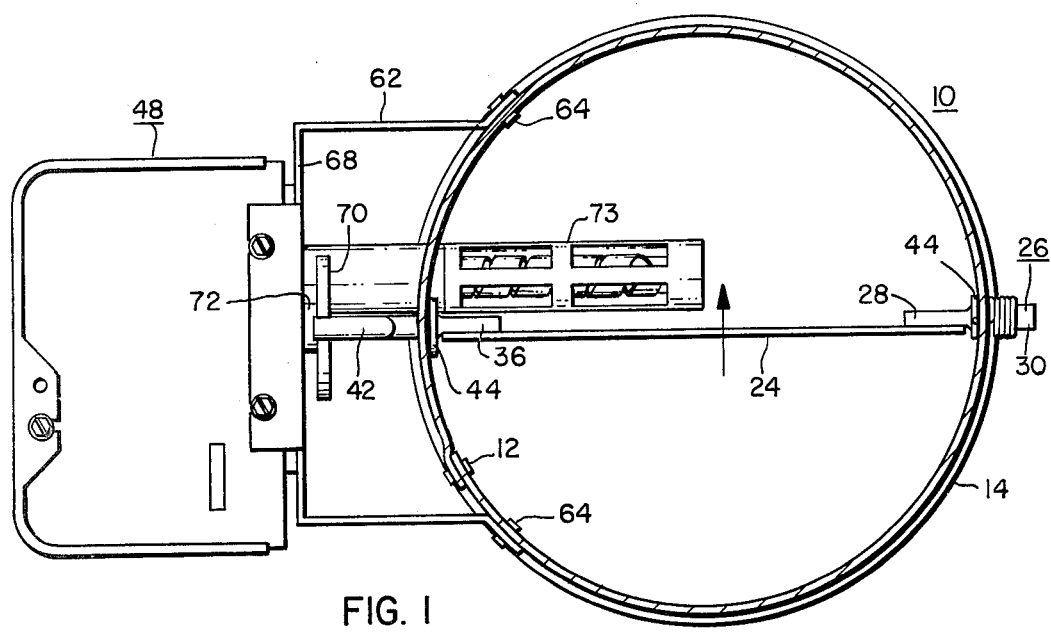
FIG. 1 is a plan view of the damper assembly.
Figure 2:
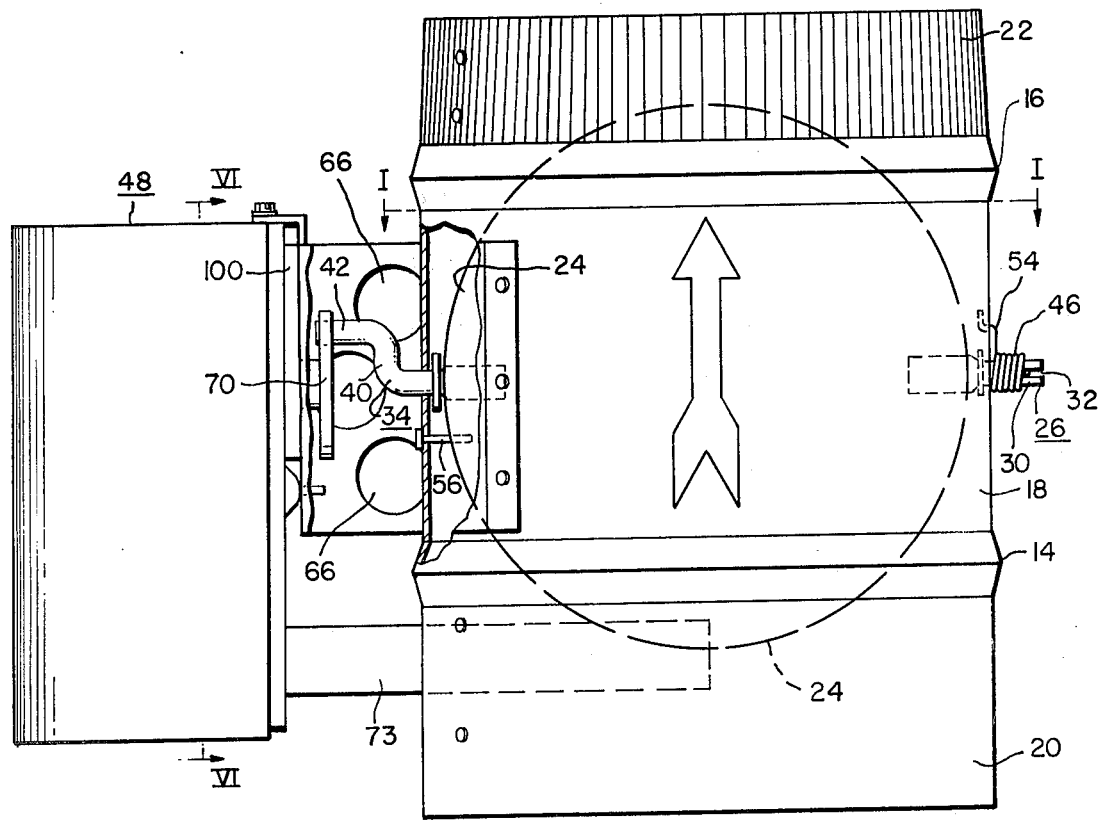
FIG. 2 is a partly broken side view of the damper assembly.

Referring to FIGS. 1 and 2, the assembled flue or vent pipe damper includes a pipe body 10 formed from a sheet of metal, such as 18 gauge aluminized steel, into a generally cylindrical shape and secured in that shape by a line of rivets 12 along the lap. Circumferentially extending beads 14 and 16 separate the central part 18 of the length from the inlet and outlet margins 20, 22, respectively. While not readily perceptible from the drawing, the pipe body is in fact slightly truncated so that the cross-sectional open area in the plane of the axis of the damper exceeds the cross-sectional area at the discharge end 22 by a sufficient amount such that, upon subtracting the obstruction of all parts in the damper axis plane (with the damper open), from the gross area in that plane, the unobstructed area equals or exceeds the area at the discharge end. By virtue of the pipe body being rolled into shape from relatively inexpensive material, the pipe body may be made sufficiently long or high that upon insertion of sheet metal screws through the lapping inlet and outlet pipes at the marginal ends, the space through which the damper plate moves is sufficiently spaced from the sheet metal screws that accidental obstruction of damper plate movement is avoided.

Figure 3:
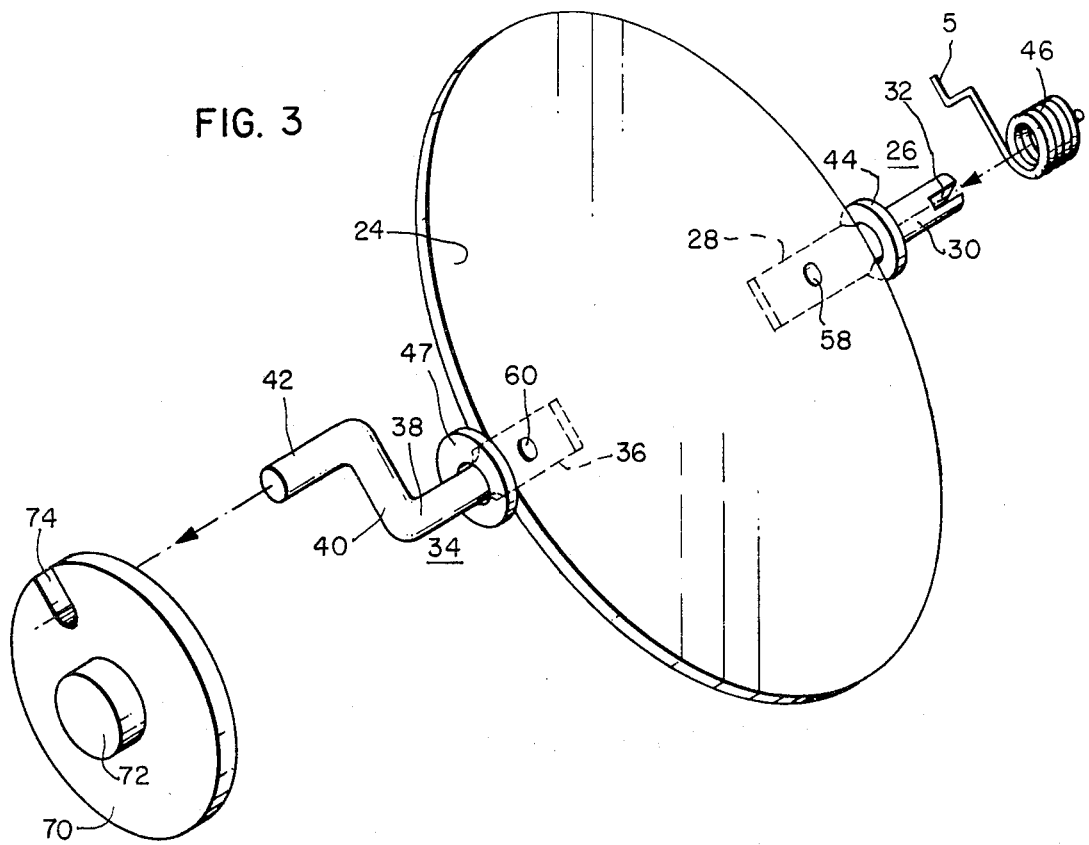
FIG. 3 is a partly fragmentary and exploded view of the coupling, shaft and damper arrangement.

The damper plate 24 is a flat circular disk of a material such as aluminized steel and has a total area sufficiently less than the cross-sectional area of the plane at the damper axis as to meet the regulatory standards regarding percentage of obstruction with the damper in a closed position. The damper plate is shown in its open position in both FIGS. 1 and 2 and is rotatable toward a closed position in a direction which, as viewed in FIG. 2, would have the top edge of the damper moving away from the viewer. To support the damper plate for its pivotal movement, two discrete stub shafts are secured to one face of the plate adjacent diametrically opposite edges of the plate and are journaled in openings at opposite sides of the pipe body. Referring to FIG. 3 as well as FIGS. 1 and 2, the shaft means includes the right-hand stub shaft 26 which has a flattened portion 28 and a straight round shaft portion 30 provided with a longitudinally extending slot 32 which lies at 90° relative to the plane of the flat. The left-hand stub shaft 34 also has a flattened portion 36 and a round shaft end portion 38 formed into a crank shape including a lever arm portion 40 and a pin portion 42 whose axis is offset from the axis of the shaft means. Each round portion of each stub shaft also carries a washer 44 slipped on and located closely adjacent the transition or beginning part of the flats.

In accordance with the invention of this application, a coiled torsion spring 46 (FIGS. 1–3) cooperates with the right-hand stub shaft 26 in the final assembly to bias the damper plate 24 to an open position in the absence of the actuator means 48 (FIGS. 1 and 2) which normally controls damper positioning. The spring has one end tine 50 which is received into slot 32, and an opposite end hook 52 which is received into a hole 54 in the pipe body at a location spaced from the axis of the shaft means. The spring is designed so that the opening force it exerts is relatively light as compared to the force imposed by the actuator means 48 in both its damper closing and opening modes. The opening force of the torsion spring need only be sufficient to overcome any frictional resistance in the damper assembly with the actuator removed. While the torsion spring force aids the force of the actuator in the damper opening mode, it opposes it in the damper closing mode which, in the currently preferred assembly, is accomplished by an electric motor drive. To limit the movement of the damper blade to the full open position when the actuator means is removed, a rivet pin 56 (FIG. 2) is fixed below the shaft means at the one side of the pipe body.

The way in which the parts of the damper assembly thus far described are assembled is as follows. The damper plate 24 is first spot welded or otherwise secured as at 58 to the flat 28 of the stub shaft 26, the washer 44 is slipped onto the shaft and the round straight part 30 of the shaft is inserted through the journaling hole of the pipe with the washer on the inside of the pipe. The torsion spring 46, which has been located with its hooked end 52 in place when the shaft was pushed through the pipe hole, is manipulated by winding it up slightly to locate the tine 50 in the slot 32. Then the opposite stub shaft 38 with its washer 44 in place has its crank end portion snaked through the opposite journaling opening in the pipe body from the inside of the pipe. The plate 24 is turned down against the torsion spring and a fixture (not shown) abuts the bottom face of the plate and positions the plate for the second spot weld or other securement at the location 60. The stub shaft 38 is of course angularly disposed so that the flat 36 is aligned with the flat 28 of the other stub shaft, and the crank-shaped end is properly directed for the ultimate coupling with the actuator means. Before the welding occurs the stub shafts are moved in opposite outward directions to almost snug up the transition parts of the flats against the washers 44, allowing about 1/16 to $\frac{1}{8}$ inch (1.6 to $3.2 \times 10^{-3}$ nm.) slop in the total assembly to avoid any binding problem. The washers 44 facilitate the positioning of the parts and prevent lateral shifting of the damper plate assembly to a point that binding would occur since the holes in the washers each lie in a plane whereas the journaling holes in the pipe body are not each in a plane.

To mount the actuator means 48 (FIGS. 1 and 2), a generally U-shaped bracket 62 is secured by riveting as at 64 along the marginal edge portions of the legs of the bracket to the intermediate section 18 of the pipe body at that side of the pipe body through which the crank-shaped end of the shaft means projects. It is noted that three openings 66 are provided in each of the opposite legs (only those in the far leg being shown in FIG. 2) to promote ventilation through the bracket regardless of the horizontal or vertical disposition of the pipe body 10 to reduce any likelihood of overheating of the actuator means 48 from the hot pipe body. The bight 68 of the bracket 62 includes a centered hole (not shown) which is large enough to readily pass the rotatable disk 70 which is fixed on the output shaft 72 of the reduction gear train of the actuator, and which in turn is driven by a synchronous clockwork motor.

The actuator frame supports, in cantilever fashion, a flue temperature responsive element 73 (FIGS. 1 and 2) which includes a helical bimetal of the type commonly used for overheat limit purposes in conventional furnace control systems. As will be explained in connection with FIGS. 4–6, this element is effective to cause opening of a normally closed switch if the flue temperature rises above a given temperature which would indicate a stoppage of adequate flow of the hot flue gases.

The coupling of the actuator means to the plate and pipe assembly is accomplished by the pin portion 42 (FIG. 3) of the crank end of the stub shaft 34 being received in the radial slot 74 of the disk 70. The width of the slot is slightly greater than the diameter of the pin 42 to facilitate the assembly and it is considered preferable that the slot extend to the periphery of the disk and may also be flared thereat to further facilitate assembly. The axis of the output shaft 72 and the damper plate shaft means are of course aligned in the assembly.

The actuator means 48 is of the type in which an electric motor, when energized, rotates the damper plate from open to closed and holds the damper closed so long as energization continues. Upon deenergization of the motor, first biasing means built in the actuator means mechanically drives the motor reversely and causes the damper plate to be moved to an open position.

Figure 4:
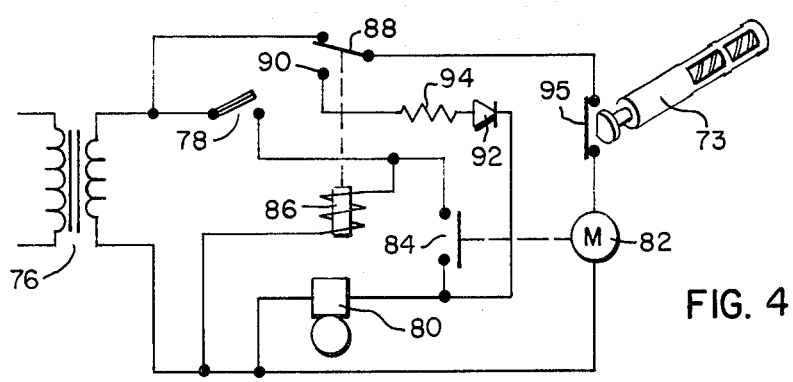
FIG. 4 is a schematic view of the circuit arrangement.

The schematic circuit of FIG. 4 for controlling the movement of the damper includes transformer 76 to obtain the usual 24 volts AC in the secondary, a room thermostat 78 which operates from open to closed in response to a demand for heat, a fuel controlling device such as a solenoid controlled gas valve 80 as shown (or an oil pump motor for an oil burner, for example), the damper motor 82 which drives the damper plate shaft means through a gear train, a damper position responsive switch 84, and relay means including actuating means such as coil 86 and controlled switch means 88. The parts of the circuit thus far described are conventional with the switch 88 in the conventional circuit being a single-pole, single-throw switch which is either open or closed under the control of the coil 86. However in the currently preferred circuit, which is the subject of Nagel U.S. Pat. application Ser. No. 900,680, filed Apr. 27, 1978 (W. E. Case 47,945), the switch 88 is a single-pole, doublethrow switch which functions, when the switch closes to terminal 90 (which in the conventional circuit would be the switchopen position), to connect a motor braking circuit including a rectifier such as diode 92, and a resistor 94 connected in series. The common terminal of switch 88 is connected through the normally closed switch 95, controlled by the flue temperature responsive element 73, to the one side of the damper motor 82. Whenever the switch 95 is open for any reason the damper motor is disconnected from across full AC, and the biasing means urges the damper toward a full open position.

As shown in FIG. 4, the circuit is in a condition in which the furnace is off, the thermostat 78 is open, the switch 88 is closed to energize motor 82 (which holds the damper plate closed) and of course the gas valve 80 is shut. Upon a demand for heat sensed by the thermostat, it closes and energizes relay coil 86 which opens switch 88 in the conventional circuit (and closes the switch to terminal 90 in the preferred circuit). In either case, the motor 82 is deenergized and the biasing means will drive the motor in the reverse direction and move the damper plate to the open position. As the damper plate closely approaches the full open position, the switch 84 closes and this results in energization of the solenoid controlling the gas valve 80 to permit flow of gas to the burners. In the conventional arrangement the reverse direction of the motor is stopped mechanically, while in the preferred Nagel arrangement the operation of switch 84 results in the application of DC to the motor through terminal 90 and switches 88 and 95. The application of DC dynamically brakes the motor so that the gearing is not subject to strain as is more fully set forth in the noted Nagel application. The resistor 94 is provided to limit motor heating and reduce stress on the diode 92, since the rectifier or braking circuit of course remains connected so long as the switch 84 is closed and the switch 88 is in the terminal 90 position corresponding to the damper being open and the furnace operating. A resistance value in the range of 20 to 50 ohms will perform quite satisfactorily with a 24 volt typical clock motor.

When the thermostat 78 opens in response to the satisfaction of the demand for heat, the relay coil 86 is deenergized so that switch 88 operates to a position energizing the damper motor 82 directly across AC to drive the damper against the biasing means to a closed position. It will be appreciated that the damper position responsive switch 84 opens almost immediately as the damper begins to move from its full open position, and of course the braking circuit is disconnected as soon as the thermostat opens.

Figure 5:
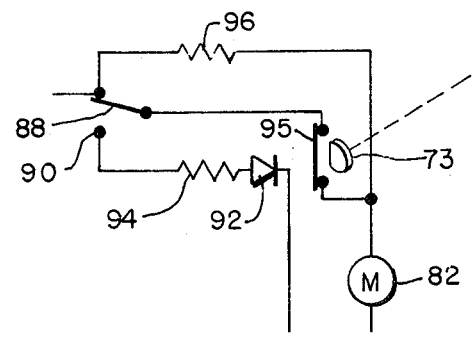
FIG. 5 is a fragmentary circuit useful as an addition to the circuit of FIG. 4.

An additional circuit herein characterized as an AC trickle circuit is also believed to be preferable to add to the basic circuit of FIG. 4, which is herein characterized as the DC dynamic braking circuit. As shown in FIG. 5, the AC trickle circuit comprises a resistor 96 which is connected between one side of the motor 82 and one side of the AC line, and in parallel with the flue temperature responsive switch 95, to provide a trickle or reduced AC current to the motor to prevent a residual magnetic locking torque from hanging-up the damper in an intermediate position under highly infrequent, but possible, conditions occurring in the operation of the furnace and controlling circuit, all as explained more fully in the noted Nagel patent application. For a typical 24-volt clock motor the resistor is preferably in the range of about 200 to 1,000 ohms.

Figure 6:
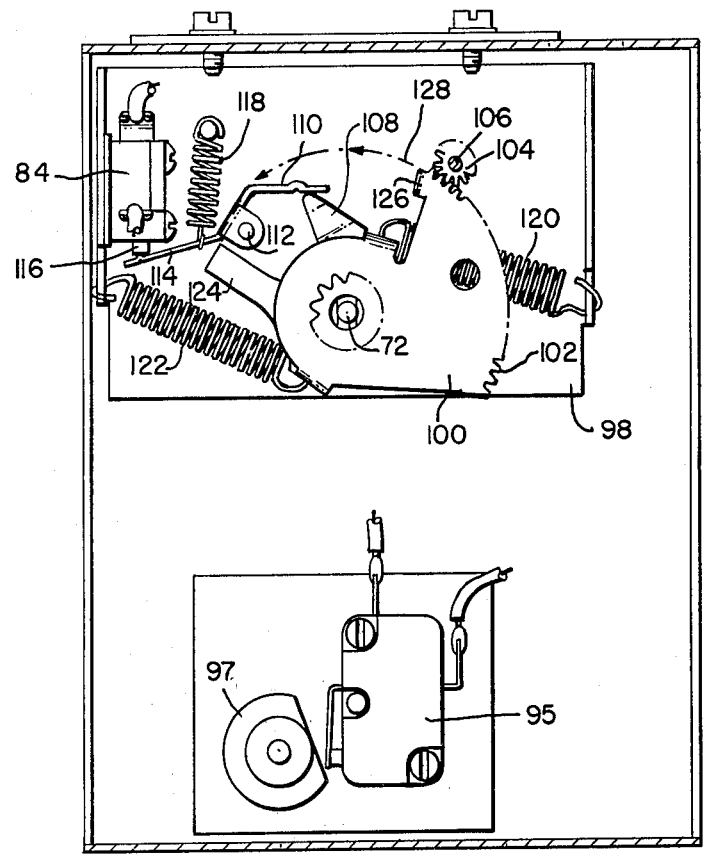
FIG. 6 is a cross-section corresponding to one taken along the line VI—VI of FIG. 2.

FIG. 6 illustrates the general arrangement of and relation between the gearing, the drive from the motor 82, the biasing means, and the damper position responsive switch means 84. The overall design of the actuator means shown is in large part contributed by others. The output shaft 72 of the actuator means is journaled in the plate 98 and pivotally mounts the sector gear 100 which has gear teeth along the arc 102. These teeth mesh with the teeth of spur gear 104 driven by the output shaft 106 of the clockwork motor 82 (not shown in FIG. 6). The arrangement as shown is in the condition corresponding to the damper being full open, switch 84 in a closed position, and the dynamic brake being on through the application of DC to the motor. Flue temperature responsive switch 95 is also closed since the flue temperature is assumed to be within normal limits in which the cams 97 driven by the helical bimetal has not opened the switch. The closure of the switch 84 occurs when the cam 108 fixed to the sector gear rocks the lever 110 in a counterclockwise direction about the pivot pin 112 to move the remote end 114 away from the switch buttom 116 and against the pull of the spring 118 biasing the lever in a switch-open direction. The main biasing means for the arrangement shown comprises two tension springs 120 and 122 which urge the sector gear 100 in a clockwise direction which drives the clockwork motor in a reverse direction. While the gear 100 carries a backup stop 124 positioned to engage the pin 112 if for any reason the dynamic braking should fail, in the intended operation the dynamic braking stops the motor rotor rotation within a fraction of a second or closure of switch 84 and stop 124 does not function by mechanically abutting the pin.

When the room thermostat 78 (FIG. 4) is satisfied and opens, the motor 82 will be energized as explained heretofore and drive the sector gear 100 in a counterclockwise direction against the biasing springs until the damper closes with the motor stopping when the abutment 126 on the sector gear has swung through the dashline arc 128 and engages the lever 110. The motor remains energized to hold the damper in a closed position. It will be understood that the arrangement of a mechanical bias in the damper open direction provides one aspect of fail-safe operation in the event of an electrical failure in the damper circuit. It also results in the actuator means automatically being in a damper open position during the assembly of the actuator means to the rest of the damper assembly, and this fortuitously corresponds to the position that the damper plate takes because of the torsion spring 46 so that the correct assembly is ensured. That is, there is no chance that the coupling between the disks 70 and pin 42 can be at other than the correct angular relationship.

We claim:

1. In an arrangement of a flue damper assembly of the type in which detachable, electrically energized actuator means holds a flue damper on a pivotal shaft closed in a flue pipe section through energization of said actuator means during periods of no-heat demand, and said actuator means includes first means biasing it to a flue damper open position in the absence of energization so that in a detached and nonenergized condition said actuator means assumes the flue damper open position, the improvement comprising:

second means connected to said shaft, and independent of said first biasing means of said actuator means, and automatically operable to move said damper to an open position in response to said actuator means being detached from operative relation with said flue damper;

said second means comprises a helical torsion spring having one end attached to said pipe section and the other in engaging relation with said pivotal shaft;

whereby said damper has an open position with said actuator means detached and deenergized, and said actuator means also has a corresponding flue damper open position facilitating recoupling with both the damper and actuator means in the corresponding damper open positions.

2. In an arrangement according to claim 1 wherein: said second means exerts a force in a damper opening direction which is relatively light as compared to the damper opening and damper closing forces exerted by said actuator means.

* * * * *